United States Patent

[11] 3,604,597

| [72] | Inventors | Harold E. Pohl<br>Kankakee, Ill.;<br>Kenneth M. Grout, Wakefield, Mass. |
|---|---|---|
| [21] | Appl. No. | 823,365 |
| [22] | Filed | May 9, 1969 |
| [45] | Patented | Sept. 14, 1971 |
| [73] | Assignee | General Mills, Inc. |

[54] PLASTIC EXTRUSION DEVICE
14 Claims, 9 Drawing Figs.

[52] U.S. Cl. .................................................. 222/146 HE,
18/3.5, 222/333
[51] Int. Cl. ...................................................... B67d 5/62
[50] Field of Search .......................................... 18/3.5;
141/82; 219/227; 222/146, 333; 401/2; 239/133,
590.3, 590.5; 192/66

[56] References Cited
UNITED STATES PATENTS

| 2,916,752 | 12/1959 | Baker | 192/66 X |
| 3,078,047 | 2/1963 | Enemark | 239/590.3 X |
| 3,281,576 | 12/1966 | Cooper et al. | 222/146 HE X |
| 3,314,573 | 4/1967 | Newton | 222/146 HE |
| 3,314,574 | 4/1967 | Longval et al. | 222/146 HE |
| 3,443,059 | 5/1969 | Spencer | 222/146 X |
| 3,459,335 | 8/1969 | Cohen et al. | 222/146 |
| 3,465,469 | 9/1969 | Winter et al. | 239/133 X |
| 3,485,417 | 12/1969 | Cocks | 222/146 |

FOREIGN PATENTS

| 945,108 | 12/1963 | Great Britain | 239/133 |

*Primary Examiner*—Joseph R. Leclair
*Assistant Examiner*—Steven E. Lipman
*Attorneys*—Anthony A. Juettner, William C. Babcock and L. MeRoy Lillehaugen ABSTRACT: A dispensing gun for melting and extruding a thermoplastic rod material in a molten state. The gun includes a heated endpiece in which the material is melted, which is detachably connected to the discharge end of the gun, and a unique drive mechanism for advancing the rod material into the endpiece. The endpiece is readily removable for cleaning purposes, or for replacing it with a similar endpiece.

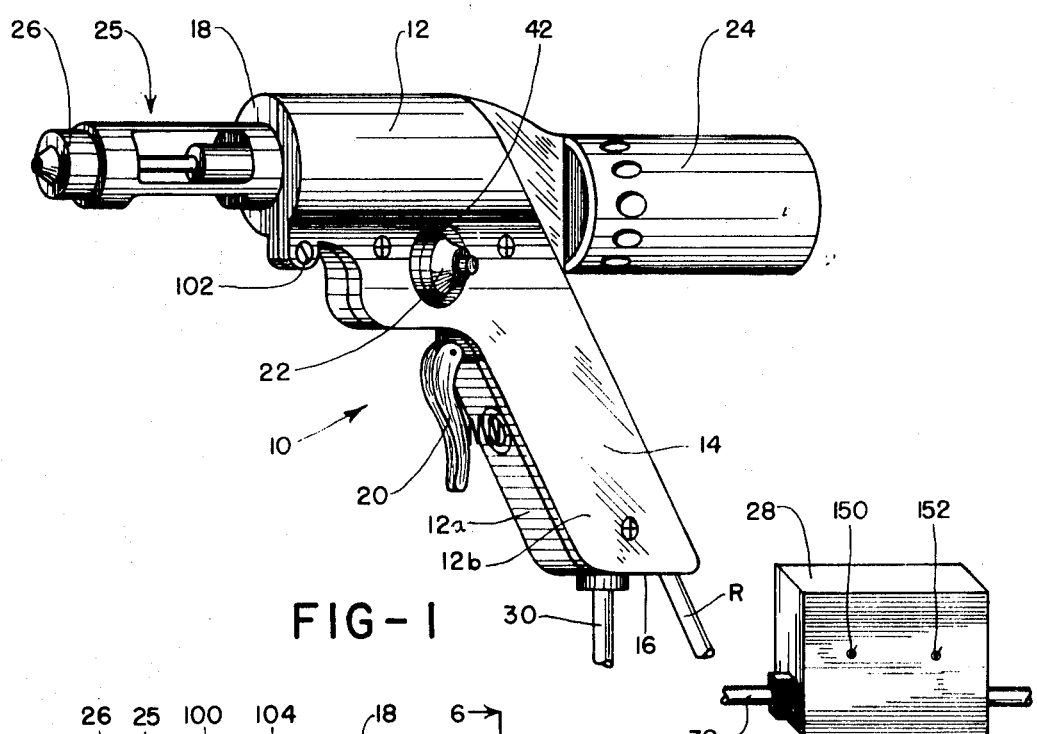
FIG-1
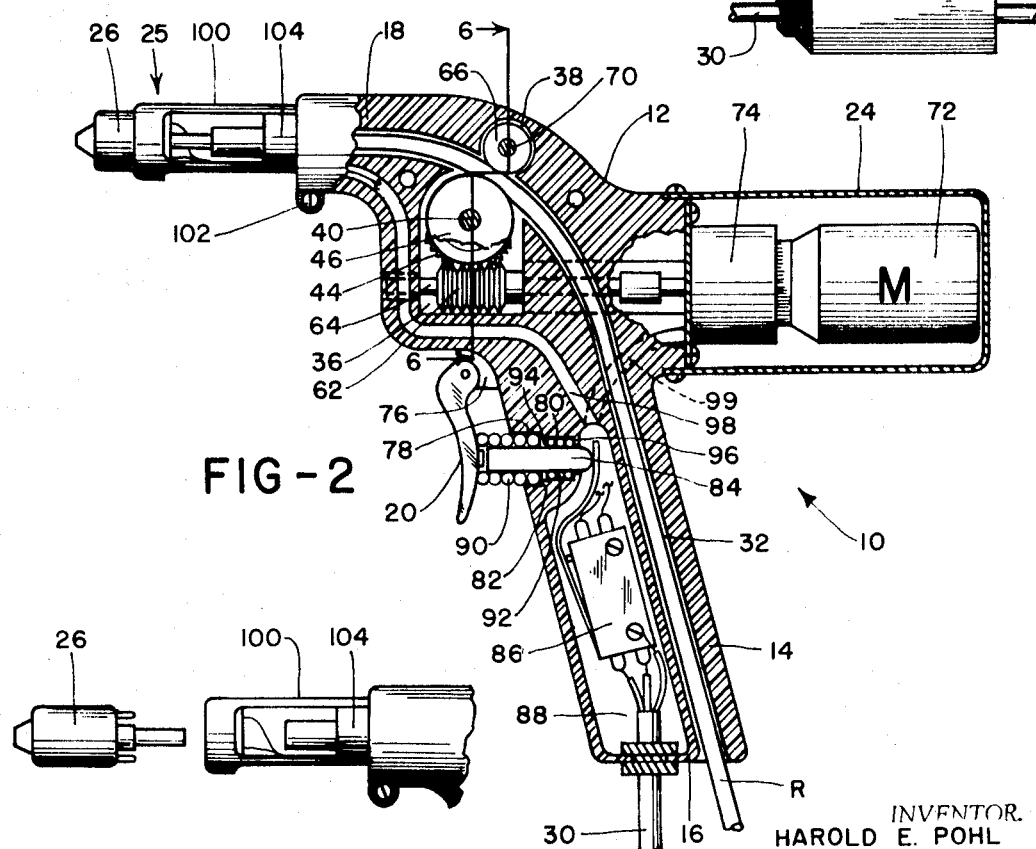
FIG-2
FIG-3
INVENTOR.
HAROLD E. POHL
KENNETH M. GROUT

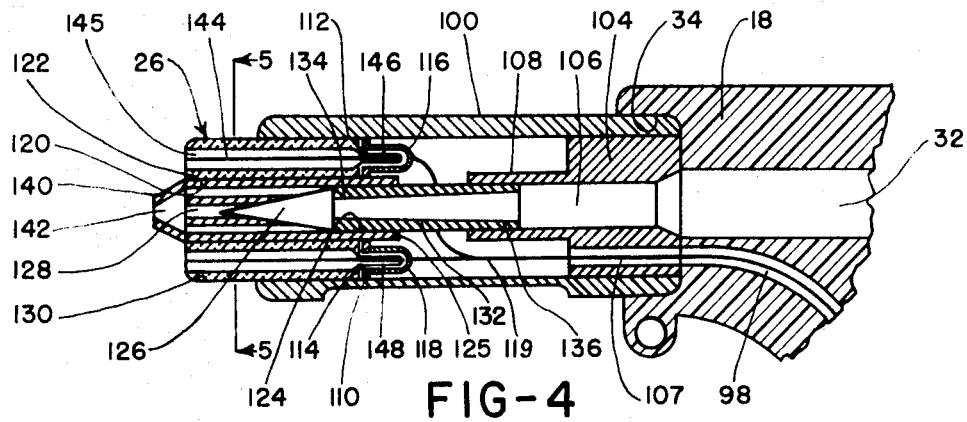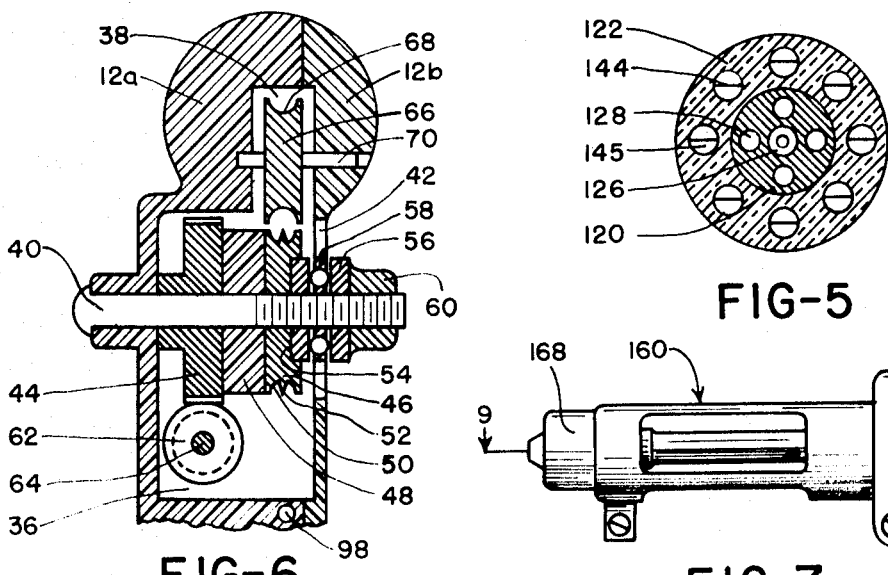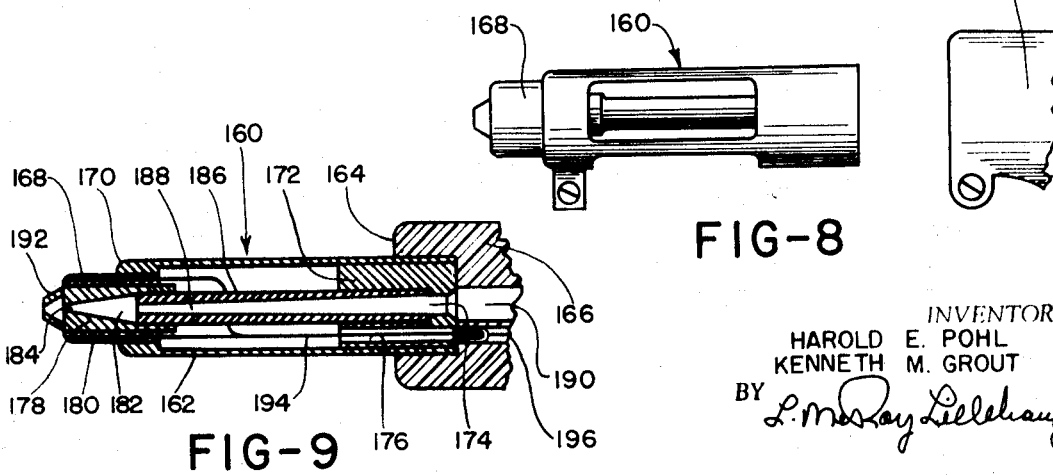

PLASTIC EXTRUSION DEVICE

The present invention relates to a plastic extrusion device, and more particularly to a hand-held dispensing gun for melting and extruding thermoplastic resins in a molten state.

As known to those in the art, thermoplastic resins are used for numerous purposes where quick-setting adhesives are desired or required. Molten thermoplastic resins of various types exhibit excellent binding characteristics for varied uses in the furniture industry, the packaging industry, the clothing industry, as well as numerous other uses, such as for repair purposes. Numerous dispensing devices have been designed for feeding a quantity of thermoplastic adhesive (usually in rod form) into a heated chamber, melting the adhesive in the chamber, and dispensing it onto a surface in a desired form. It has been discovered that the known devices ofttimes exhibit one or more of the following disadvantages: they are expensive to manufacture; they are bulky to handle; they are subject to dripping or drooling, of the molten thermoplastic from the nozzle during periods of nonuse, while the device is still warm; they are difficult to keep clean, as well as to clean; they are limited to the use of a thermoplastic rod of a prescribed type, size, and shape; they can only form a bead or dot of a single type without substantially modifying the device; it is difficult to maintain the melting chamber at a desired temperature; and it is difficult to maintain a desired feed rate of material through the device.

Accordingly, one object of the present invention is to provide an improved plastic extrusion device.

Another object is to provide a thermoplastic adhesive-dispensing gun in which the melting chamber and discharge orifice can readily be separated from the rest of the gun.

A further object is to provide a portable hotmelt-dispensing gun which is relatively simple in construction, inexpensive to manufacture, and easy and convenient to operate.

A still further object is to provide a hotmelt-dispensing fun in which the endpiece containing the melting chamber and discharge orifice, can readily be replaced with another endpiece.

Another object is to provide a hotmelt-dispensing gun having improved feed means for advancing a rod of thermoplastic material through the gun at a uniform and adjustable feed rate.

Other objects and advantages will become apparent from a consideration of the following specification and accompanying drawings. Before proceeding with a detailed description of the invention, a brief description of it will be presented.

Briefly, the device includes a body portion which has a passage or channel therein into which a rod of thermoplastic adhesive material can be fed, through an inlet end. A drive mechanism is provided within the device for gripping the rod and advancing it through the passage at a desired feed rate. An end portion which includes an endpiece, is secured to the discharge end of the device in such a manner that at least the endpiece can readily be separated from the device. The endpiece is provided with a passage therethrough, and it is heated to a prescribed temperature by means of a heater shell which surrounds the endpiece; the heater shell being connected to a source of electrical energy. Thermoplastic rod material which is advanced through the device, is heated to a molten state within the removable endpiece and dispensed therefrom through a nozzle having a prescribed orifice onto a desired surface, in the form of a bead, dot, or ribbon.

The invention will best be understood by reference to the following drawings wherein;

FIG. 1 is a perspective view illustrating the invention;

FIG. 2 is an enlarged partial sectional view illustrating the invention in detail;

FIG. 3 is a partial view similar to FIG. 2, but illustrating the apparatus partially disassembled;

FIG. 4 is an enlarged partial sectional view of the endpiece disclosed in FIG. 2;

FIG. 5 is a sectional view taken along line 5—5 of FIG. 4;

FIG. 6 is an enlarged partial sectional view taken along line 6—6 of FIG. 2;

FIG. 7 is a partial view, similar to FIG. 2, which illustrates another embodiment of the invention;

FIG. 8 shows the device of FIG. 7 in a partially disassembled condition; and

FIG. 9 is a sectional view taken along line 9—9 of FIG. 7.

FIG. 1 illustrated a plastic extrusion device or dispensing gun designated generally by reference numeral 10. The gun 10 includes a body portion 12 which is provided with a handle or grip portion 14 having an inlet end 16, and a discharge end 18 at the other end of the body portion. As shown in FIG. 1, the body 12 is formed of a main frame member 12a and a cover or plate member 12b which is attached to the frame by appropriate means, such as by bolts or screws. An opening 42 is provided in the plate 12b. The device also includes a trigger mechanism 20, a friction clutch mechanism 22 which projects through the opening 42, a motor housing 24, and an end portion designated by numeral 25, which includes an endpiece 26 which is detachably connected to the discharge end 18 of the device.

A thermoplastic adhesive rod R is depicted as being fed into the gun at its inlet end 16. At this point, it might be pointed out that the device can be used in conjunction with a variety of thermoplastic materials, and there is no intention to limit the use of the device to any specific type of thermoplastic resin, as it can readily be used with polyamide resins, versalon resins, polyester resins, polyethylene resins, and the like. The desired melting temperature, as well as the desired feed rate might vary of course, depending upon the particular resin being used.

The gun 10 is electrically connected to a transformer and rectifier unit 28 by means of an electrical wire 30; and the unit 28 in turn, is connected to an appropriate electrical outlet. The unit 28 performs a number of functions. In many instances a DC motor will be used for driving the mechanism 22; thus, the device 28 will convert alternating current to direct current. Moreover, such a device can be used to conveniently provide more than one heat range to the gun. Units of this type are commercially available; therefore, no detailed description of their construction and operation is believed necessary. It might be pointed out, that if preferred, the gun could be designed to operate directly from a 110 volt AC electrical source, by including appropriate electrical components within the gun. For purposes of illustration however, it will be described in conjunction with the unit 28.

FIG. 2 illustrates the gun 10 in greater detail. As shown, the body portion 12 is provided with an elongate channel or passage 32 which extends from the inlet end 16 of the handle 14 to the discharge end 18. The cross-sectional size and shape of the channel 32 can vary, depending upon the size and shape of the rod being fed into the gun. A cavity 34 is provided at the discharge end of the device, which is somewhat larger than the size of the channel 32 (note FIG. 4).

A pair of chambers or cavities 36 and 38 are formed within the body 12. The cavities are provided for holding the clutch mechanism 22, and a drive mechanism for advancing the rod through the channel 32 at a desired feed rate; FIG. 6 illustrates this structure in greater detail. A threaded shaft 40 is fixedly mounted within the frame 12a so that is projects through the opening 42 in the plate 12b. A spur gear 44, provided with teeth on its periphery, is rotatably mounted on the shaft 40, and it is separated from a feed roller 46 by a washer 48 formed of a suitable compressible and resilient material. The feed roller 46 is formed with a peripheral groove 50, which at least partially surrounds the rod material, and it also has a plurality of pointed prongs or teeth 52 in the groove which aid in gripping or engaging the rod. A pair of thrust washers 54 and 56 are positioned on the shaft proximate the feed roller 46, and they are separated from each other by a thrust bearing 58. Finally, a nut 60 is threaded onto the end of the shaft 40. The purpose of the nut is to provide a means of controlling the thrust on the feed roller 46. All of the members mounted on the shaft 40, except the nut 60, are rotatable relative to the shaft. A worm gear 62, fixedly mounted on a shaft 64 by appropriate means, is also positioned within the chamber 36 so that it engages the teeth on the periphery of the gear 44. A guide roller 66 having a peripheral groove 68, is rotatably mounted on shaft 70 within the cavity 38, so that it is aligned with, and spaced from, the feed roller 46.

A drive motor 72 is mounted within the motor housing 24, and its output shaft is operatively connected to the shaft 64 by an appropriate gear reducer mechanism 74 and drive shaft. Various types of drive motors and gear reducers are commercially available which might be satisfactorily used, therefore they will not be described in further detail.

The trigger mechanism 20 is pivotally attached to the body portion 12 at 76. The grip portion 14 is provided with a bore formed of two different sizes; a first bore 78, and a second bore 80 which is smaller than the first bore 78, and which forms a shoulder 82 with the first bore. A movable plunger 84 is positioned within the bores 78 and 80 in such a manner that one of its ends abuts against the trigger 20, and its other end activates a switch mechanism 86, positioned within the cavity 88 in the handle portion of the gun. Any number of commercially available switches might be used; preferably a "push on"-type switch is used. A first spring 90 is positioned within the bore 78, and it biases the trigger 20 toward the left as viewed in FIG. 2. A second spring 92 is positioned within the bore 80 in such a manner that it abuts against a flange 94 attached to the plunger 84, and an abutment 96 at the base of the bore 80, thus also biasing the plunger 84 toward the left as viewed in FIG. 2. Passages 98 and 99 extend from the cavity 88 to the discharge end 18 and the motor housing 24 respectively.

Reference is now made to the end portion 25. A heater element housing 100 is attached to the discharge end 18 of the gun by positioning it within the cavity 34, note FIG. 4. For cooling purposes, the housing 100 is preferably formed with enlarged openings for permitting heat to dissipate. The housing 100 is firmly retained within he cavity 34 by tightening a bolt-and-nut arrangement 102 mounted on the discharge end 18 of the device, by providing a band member around the discharge end of the boy portion 12, or some similar arrangement. A plug member 104 having a first passage 106 and a second smaller passage 107 therein, is press fit within one end of the housing 20 so that the passage 106 is aligned with the passage 32 in the gun, and the passage 107 is aligned with the passage 98 in the gun. The plug 104 includes a neck portion 108 which projects into the housing 100 toward the projecting end of the housing. A ring-shaped member 110, having a pair of openings 112 and 114 therein, is press fit within the housing 100 proximate its other end. A pair of female connectors or sockets 116 and 118 are secured to the member 110 so that they surround the openings 112 and 114 respectively. Each connector 116 and 118 is connected to a source of electrical energy by electrical leads 119 positioned within passages 107 and 98.

The endpiece 26 is positioned within the projecting end of the housing 100 in such a manner that it fits relatively snug with respect to the housing. As illustrated more fully in FIG. 4, the endpiece includes a liner member 120 which is surrounded by a tubular or shell-like heater unit 122. The liner 120 is provided with an elongate passage 124 which extends from a first end 125 of the liner and terminates with a conical cavity 126 within the liner body. A plurality of discharge passages 128 extend from the second end 130 of the liner into the cavity 126. As shown, the passages 128 are substantially smaller than the passage 124, and they are parallel to the axis of the passage 124. While the liner 120 might be formed of a variety of materials, preferably, it is formed of a material such as copper which has excellent heat-conductive properties.

An elongate tubular member or feed tube 132 is connected to the liner 120, by force fitting a first end 134 into the end 125 of the liner. The second end 136 of the tubular member projects into the passage 106 within the neck 108 of the plug 104. While the connection between tube 132 and neck 108 should be somewhat snug, it should not be so tight that the members cannot be readily moved with respect to each other. The cross-sectional size of the passage within the tube 132 varies. As illustrated in FIG. 4, the thickness of the tube wall at the end 136 is smaller than the wall thickness at the end 134. As a result, a gradually tapered flow channel is formed within the tubular member. A tapered flow channel of this type aids in inducing the flow of molten material from the right to the left, as viewed in FIG. 4. A nozzle 140 having a discharge orifice 142 of a prescribed size, is attached to the end of the liner so that it surrounds the discharge passages 128.

The heater unit 122 fits snugly around the liner 120 so that the members do not move with respect to each other, and it is included for heating the endpieces to a prescribed temperature level so as to melt material within the cavity of the liner member 120. Commercially available heater units are readily available to fit the specific heating requirements desired. Hotwatt, Inc., of Danvers, Massachusetts for example, makes a variety of cartridge-heating units which might be used with satisfactory results. Hotwatt, Inc. Bulletin 510 6/66 5M depicts a number of ceramic heater units illustrative of the general type which might be used. While a detailed description of the units is believed to be unnecessary, a brief description of the units will be presented. As shown in FIGS. 4 and 5, the heater unit 122 includes a continuous resistance wire 144 positioned within passages 145 in a ceramic shell, the passages 145 being equidistantly spaced around the center of the unit. The resistance wire 144 is connected to a pair of male plug members or prongs 146 and 148, and when connected to a source of electrical energy, they provide heat to the endpiece 26. The number of passages 145 can vary, depending upon the specific heating requirements desired.

An endpiece having a liner with a plurality of longitudinal discharge passages therein, and a heater unit with a plurality of conductors therein has been found to work with very satisfactory results. The longitudinal passages in the liner and the continuous resistance wire provide excellent heat transfer to a greater surface area of the resin. Moreover, the overall volume of molten resin which is retained within the passages is small enough to minimize post-drip or drooling when feed of the rod into the gun is discontinued. The ceramic heater shell unit provides uniform distribution of heat around the liner, as well as excellent heat retention during operation. The resultant even distribution of heat seems to minimize resin degradation and it provides greater fluidity in relation to the size of the heat unit.

The switch 86 is provided for controlling the flow of electrical current to the motor 72 and to the heater unit 122. In FIG. 1, a commercially available transformer and rectifier unit 28 is interposed between the extrusion gun and the electrical outlet. The unit 28 is provided for furnishing two heating ranges or levels to the endpiece, a maintenance heat of a specific temperature while the gun is at rest, and a higher operating temperature for use during the melting and extruding operation. The unit 28 is provided with a first switch 150 and a second switch 152. By connecting the gun to the unit 28 and turning the switch 150 to the "on" position, electrical current flow directly to the heater unit 122, thereby raising the temperature of the endpiece to a specific level. When the switch 152 is turned to the "on" position, electrical current flows to the switch 86. When the switch 86 is activated by the trigger assembly 20, the current flows to both the motor 72 and the heater unit 122, thereby raising the temperature of the unit 122 to a level hot enough to melt the thermoplastic resin being fed into the endpiece. If preferred of course, the gun could be designed to operate with only a single heating level.

In operation, the unit 28 is connected to an ordinary household outlet, and the gun 10 is then connected to the unit 28. An endpiece 26 is selected which has the desired heating capabilities and the desired nozzle opening. The endpiece is attached to the housing 100 by inserting it within the projecting end of the housing in such a manner that the prongs 146 and 148 are inserted within the female connectors 116 and 118 respectively. With the switch 150 in the "on" position, electrical energy flows through the leads 120 to the endpiece so that the endpiece is heated to a first temperature level. The particular temperature level desired will of course, depend upon the particular thermoplastic material being used, its size, and the like. After the gun, and more particularly the endpiece 26 has been permitted to reach its initial temperature setting, a rod R is inserted within the channel 32 until it is engaged by the rollers 46 and 66. With the switch 152 in the "on" position, electrical current will flow to the switch 86. By actuating the trigger mechanism 20, the current will flow simultaneously to the motor 72 and to the heating element 26. The additional flow of electrical energy to the heating element 26 raises its temperature to a higher level, i.e., hot enough to melt the thermoplastic material as it enters the heating chamber.

When the motor 72 is energized, it causes the worm gear 62, and more particularly, the spur gear 44 to rotate at a prescribed speed. As the gear 44 rotates, rotational movement is also imparted to the feed roller 46, by means of the member 48 which frictionally engages both the gear 44 and the roller 46, thus effectively coupling them together. By loosening or tightening the nut 60 with respect to the shaft 44, the clutch mechanism will cause the feed roller 46 to rotate at the same rate of speed as the gear 44, or if the nut is loosened a sufficient amount, the roller 46 will tend to slip with respect to the member 48. As the roller 46 is caused to rotate, it cooperates with the roller 66 to advance the rod material toward the discharge end of the gun, and more particularly, into the heated endpiece 26. As the thermoplastic material is advanced into the endpiece, it is transformed from a rod form into a molten state prior to reaching the nozzle orifice 142.

As additional molten thermoplastic material is required, the operator continues to squeeze the trigger mechanism 20, thereby causing the rod to be fed into the heating chamber at a prescribed feed rate. The feed rate should be adjusted (by means of the clutch mechanism 22) to correlate to the melting rate of the material within the endpiece. When the extruding operation is completed or interrupted, the trigger mechanism is released, so that the motor is no longer energized, and the endpiece is permitted to cool to its first temperature setting. Thus, the gun will be in a state of readiness for additional usage, and when such further use is desired, the trigger mechanism is merely actuated so that the rod material is again caused to advance into the channel 32, and the endpiece is heated to the higher temperature level. After the extruding operation has been completed, and the heater element housing 100 has cooled, the element 26 can readily be separated from the gun for cleaning purposes. Moreover, in some instances it might be desired to use an endpiece which is somewhat different in construction; therefore, an endpiece having different structural and functional characteristics can easily be substituted for the one being used, by merely removing the one endpiece and replacing it with another.

FIGS. 7-9 illustrate another embodiment of a dispensing gun having a removable end portion designated by numeral 160. The end portion 160 includes a heater element housing 162, similar to housing 100 in FIG. 2, which is removably attached to the discharge end 164 of a gun 166, by appropriate means. As shown more clearly in FIG. 9, an endpiece 168 is fixedly mounted within the projecting end 170 of the housing 162, in such a manner that it is not readily separable from the housing. A plug 172, having passages 174 and 176 extending therethrough, is positioned within the end of the housing 162 proximate the discharge end of the gun.

The endpiece 168 includes a liner member 178, which is surrounded by a heater unit 180. The liner 178 is provided with a passage 182, the major portion of which is somewhat conically shaped, and which terminates with an orifice 184. A feed tube 186 having a tapered flow channel 188 therein, is mounted with respect to the liner 178 so that one of its ends is positioned within the passage 182 in the liner, and its other end is positioned within the passage 174 in the plug 172. Thus, the passages 182, 188, and 174 are aligned with respect to a discharge passage 190 in the gun. A nozzle 192 is fixedly connected to the discharge end of the endpiece.

The heater unit 180 is substantially the same in construction as the heater unit 122 described in conjunction with FIG. 2, and it is electrically connected by leads 194 to an appropriate connector device, and to leads 196 positioned within the gun, the leads 196 in turn being electrically connected to a switch and source of electrical power (not shown).

In operation, an end portion 160, including the housing 162 and the endpiece 168, is selected having the desired structural and functional requirements. The selected end portion is detachably connected to the discharge end of the gun by inserting it within an appropriate cavity in the gun. A selected thermoplastic rod material is advanced into the housing 162, and more specifically, the feed tube 186, and ultimately into the passage 182 within the heated endpiece 168, where it is heated to a molten state and discharged through the nozzle 188, in a desired shape or form. When the operation has been completed the entire portion 160 can be removed for cleaning purposes, or for replacing it with another similar unit. FIG. 8 depicts the invention after the end portion 160 has been detached from the gun.

In the above description and attached drawings, a disclosure of the principles of this invention if presents, together with some of the embodiments by which the invention might be carried out. Now, therefore, we claim:

1. An extrusion device for melting and extruding molten thermoplastic material comprising a body portion portion which includes a handle portion, an inlet end, a discharge end, an elongate channel extending from said inlet end to said discharge end for receiving a thermoplastic rod material, means for advancing said rod material through said passage when said rod material is introduced into the inlet end, an endpiece having an elongate passage therethrough which terminates with at least one discharge orifice, said endpiece including a liner member having said elongate passage therein, said liner member including a plurality of discharge passages which communicate with said elongate opening thereby forming a plurality of discharge orifices, each of said passages having a smaller cross-sectional size than that of the elongate passage, means at least partially surrounding said endpiece for heating said endpiece to a temperature of sufficient magnitude to melt said rod material when introduced into said elongate passage in the endpiece, and means for detachably connecting said endpiece to the discharge end of the device so that the elongate opening in the endpiece is aligned with the elongate passage in the body portion.

2. The combination of claim 1 wherein said liner member is formed of copper.

3. The combination of claim 1 wherein a tapered nozzle is secured to the discharge end of the endpiece.

4. An extrusion device for melting and extruding molten thermoplastic material comprising a body portion which includes a handle portion, an inlet end, a discharge end, an elongate channel extending from said inlet end to said discharge and for receiving a thermoplastic rod material, means for advancing said rod material through said passage when said rod material is introduced into the inlet end, an endpiece having an elongate passage therethrough which terminates with at least one discharge orifice, means at least partially surrounding said endpiece for heating said endpiece to a temperature of sufficient magnitude to melt said rod material when introduced into said elongate passage in the endpiece, said means comprising a tubular member which surrounds the endpiece, said member including a plurality of electrical conductors positioned within the member for supplying heat to the endpiece when the conductors are connected to a source of electrical energy, and means for detachably connecting said endpiece to the discharge end of the device so that the elongate opening in the endpiece is aligned with the elongate passage in the body portion.

5. The combination of claim 4 wherein the means for detachably connecting the endpiece to the extrusion device includes housing means interposed between said endpiece and the discharge end of the device.

6. The combination of claim 4 wherein the means for advancing the rod material through the device includes at least one roller adapted to engage the surface of the rod material and continuously move it longitudinally within the passage in the device, motor means forming a part of said extrusion device for causing said roller to rotate, means for energizing said motor means, and switch means for controlling the flow of electrical energy to said motor means.

7. The combination of claim 6 wherein said switch controls the flow of electrical energy to the motor means and to the means for heating the endpiece.

8. The combination of claim 7 wherein means are provided for controlling the temperature of the heater means between at least two different ranges.

9. The combination of claim 6 wherein a friction clutch mechanism is provided for controlling the rotational speed of the roller, relative to he output speed of the motor means.

10. An extrusion device for melting and extruding molten thermoplastic material comprising a body portion which includes a handle portion, an inlet end, a discharge end, an elongate channel extending from said inlet end to said discharge end for receiving a thermoplastic rod material, means for advancing said rod material through said passage when said rod material is introduced into the inlet end, an endpiece having an elongate passage therethrough which terminates with at least one discharge orifice, means for heating said endpiece to a temperature of sufficient magnitude to melt said rod material when introduced into said elongate passage in the endpiece, said endpiece including a liner member having said elongate passage therein, said liner member including a plurality of discharge passages which communicate with said elongate opening thereby forming a plurality of discharge orifices, each of said passages having a smaller cross-sectional size then that of the elongate passage, said elongate passage terminating with a conically shaped cavity within the endpiece, each of the discharge passages communicating with said cavity, and means for detachably connecting said endpiece to the discharge end of the device so that the elongate opening in the endpiece is aligned with the elongate passage in the body portion.

11. An extrusion device for melting and extruding molten thermoplastic material comprising a body portion which includes a handle portion, an inlet end, a discharge end, an elongate channel extending from said inlet end to said discharge end for receiving a thermoplastic rod material, means for advancing said rod material through said passage when said rod material is introduced into the inlet end, an endpiece having an elongate passage therethrough which terminates with at least one discharge orifice, means for heating said endpiece to a temperature of sufficient magnitude to melt said rod material when introduced into said elongate passage in the endpiece, said endpiece including a liner member having said elongate passage therein, said liner member including a plurality of discharge passages which communicate with said elongate opening thereby forming a plurality of discharge orifices, each of said passages having a smaller cross-sectional size then that of the elongate passage, an elongate tubular member which is operatively connected at one end to the liner member and at its other end to the discharge end of the device thereby aligning the passages in the liner member, the tubular member, and the discharge end of the device along a common line when the endpiece is secured to the discharge end of the extrusion device, and means for detachably connecting said endpiece to the discharge end of the device so that the elongate opening the endpiece is aligned with the elongate passage in the body portion.

12. The combination of claim 11 wherein the cross-sectional size of the passage in the tubular member proximate the liner member is smaller than the passage at the opposite end of said tubular member.

13. An extrusion device for melting and extruding molten thermoplastic comprising a body portion which includes a handle portion, an inlet end, a discharge end, an elongate channel extending from said inlet end to said discharge end for receiving a thermoplastic rod material, means for advancing said rod material through said passage when said rod material is introduced to the inlet end, an endpiece having an elongate passage therethrough which terminates with at least one discharge orifice, means for heating said endpiece to a temperature of sufficient magnitude to melt said rod material when introduced into said elongate passage in the endpiece, and means for detachably connecting said endpiece to the discharge end of the device so that the elongate opening in the endpiece is aligned with the elongate passage in the body portion, said means for detachably connecting the endpiece to the extrusion device including housing means interposed between said endpiece and the discharge end of the device, said endpiece being detachably connected to said housing means, and said housing being secured to the device.

14. An extrusion device for melting and extruding molten thermoplastic material comprising a body portion which includes a handle portion, an inlet end, a discharge end, an elongate channel extending from said inlet end to said discharge end for receiving a thermoplastic rod material, means for advancing said rod material through said passage when said rod material is introduced into the inlet end, an endpiece having an elongate passage therethrough which terminates with at least one discharge orifice, means for heating said endpiece to a temperature of sufficient magnitude to melt said rod material when introduced into said elongate passage in the endpiece, and means for detachably connecting said endpiece to the discharge end of the device so that the elongate opening in the endpiece is aligned with the elongate passage in the body portion, said means for detachably connecting the endpiece to the extrusion device including housing means interposed between said endpiece and the discharge end of the device, said housing means being detachably connected to the device, and said endpiece being secured to said housing.